United States Patent
MacGregor et al.

(10) Patent No.: US 7,126,338 B2
(45) Date of Patent: Oct. 24, 2006

(54) ELECTROMAGNETIC SURVEYING FOR HYDROCARBON RESERVOIRS

(75) Inventors: Lucy M MacGregor, Southampton (GB); Martin C Sinha, Edinburgh (GB)

(73) Assignee: Statoil ASA(NO)

( * ) Notice: Subject to any disclaimer, the term of this patent is extended or adjusted under 35 U.S.C. 154(b) by 305 days.

(21) Appl. No.: 10/497,807

(22) PCT Filed: Nov. 28, 2002

(86) PCT No.: PCT/GB02/05355

§ 371 (c)(1),
(2), (4) Date: Jun. 4, 2004

(87) PCT Pub. No.: WO03/048812

PCT Pub. Date: Jun. 12, 2003

(65) Prior Publication Data

US 2005/0077902 A1  Apr. 14, 2005

(30) Foreign Application Priority Data

Dec. 7, 2001 (GB) .................................. 0129407.3

(51) Int. Cl.
*G01V 3/08* (2006.01)
(52) U.S. Cl. .................................................. 324/334
(58) Field of Classification Search ................ 324/332, 324/334, 337–339, 365
See application file for complete search history.

(56) References Cited

U.S. PATENT DOCUMENTS

| | | |
|---|---|---|
| 3,548,299 A | 12/1970 | Duroux et al. |
| 4,617,518 A | 10/1986 | Srnka |
| 4,633,182 A | 12/1986 | Dzwinel |
| H001490 H * | 9/1995 | Thompson et al. ............ 367/15 |
| 6,236,212 B1 * | 5/2001 | Wynn ............................ 324/365 |
| 6,628,119 B1 | 9/2003 | Eidesmo et al. |
| 6,842,006 B1 * | 1/2005 | Conti et al. .................. 324/350 |

FOREIGN PATENT DOCUMENTS

| | | |
|---|---|---|
| GB | 2 355 538 | 1/2000 |
| WO | 00/13046 | 3/2000 |
| WO | 00/54075 | 9/2000 |
| WO | 01/57555 | 8/2001 |

OTHER PUBLICATIONS

Young & Cox, Electromagnetic active source near the East-Pacific rise, Geophysical Research Letters, vol. 8, No. 10, pp. 1043-1046, Oct. 1981.

Chave & Cox, Controlled electromagnetic sources for measuring electrical conductivity beneath the oceans 1. Forward problem and Model Study, J. Geophysical Research, vol. 87, No. B7, pp. 5327 to 5338, Jul. 10, 1982.

(Continued)

*Primary Examiner*—Jay M. Patidar

(57) ABSTRACT

An electromagnetic survey method for surveying an area previously identified as potentially containing a subsea hydrocarbon reservoir, comprising obtaining first and second survey data sets with an electromagnetic source aligned end-on and broadside relative to the same or different receivers. The invention also relates to planning a survey using this method, and to analysis of survey data taken in combination allow the galvanic contribution to the signals collected at the receiver to be contrasted with the inductive effects, and the effects of signal attenuation, which are highly dependent on local properties of the rock formation, overlying water and air at the survey area. This is very important to the success of using electromagnetic surveying for identifying hydrocarbon reserves and distinguishing them from other classes of structure.

54 Claims, 6 Drawing Sheets

OTHER PUBLICATIONS

Sinha et al, An active source electromagnetic sounding system for marine use, Marine Geophysical Researches, 12:69-68, 1990.

Evans et al, Upper crustal resistivity structure of the East-Pacific Rise near 13 degrees North, Geophysical Research Letters, vol. 18, No. 10, pp. 1917-1920, Oct. 1991.

Evans et al, On the electrical nature of the axial melt zone at 13 degrees North on the East Pacific Rise, Journal of Geophysical Research, vol. 99, No. B1, pp. 577-588, Jan. 1994.

Evans, Constraints on the large-scale porosity and permeability structure of young oceanic crust from velocity and resistivity data, Geophysical Journal International, vol. 119, pp. 869-879, 1994.

Unsworth, Insight into induction, Chapter 5 in Electromagnetic exploration of the oceanic crust with controlled-sources, PhD thesis, University of Cambridge, 1991.

Sinha et al, Magmatic processes at slow spreading ridges: implications of the RAMASEES experiment at 57 degrees 45 minutes North on the Mid-Atlantic Ridge, Geophysical Journal International, vol. 135, pp. 731-745, 1998.

Barton et al, LITHOS Cambridge advanced lithological imaging project phase 1: 1998-2001 Sub-basalt imaging, 1997.

Explorations, Scripps Institute of Oceanography, vol. 4, No. 2, 1997.

Sinha et al, Sub-sea-floor imaging for structural and lithological properties using controlled source electromagnetic (CSEM) sounding, abstract for Technology for deep-sea geological investigations: Developments, applications and results, Nov. 11-12, 1998.

Sinha & MacGregor, Use of marine controlled-source electromagnetic sounding for sub-basalt exploration, Geophysical Prospecting, vol. 48, pp. 1091-1106, 2000.

Sinha, Controlled source EM sounding: Survey design considerations for hydrocarbon applications, LITHOS Science Report, vol. 1, pp. 95 to 101, Apr. 1999.

Kaufman & Keller, Frequency and transient soundings, Elsevier Science Limited, ISBN 0-444-42032-0, 1983.

Spies, Recent developments in the use of surface electrical methods for oil and gas exploration in the Soviet Union, Geophysics, vol. 48(8), pp. 1102-1112, 1983.

Cheeseman et al, On the theory of sea-floor conductivity mapping using transient electromagnetic systems, Geophysics, vol. 52(2), pp. 204-217, 1987.

Nekut and Spies, Petroleum exploration using controlled source electromagnetic, methods, Proceedings of the IEEE, vol. 77(2), pp. 338-362, 1989.

Greaves et al, New dimensions in geophysics for reservoir monitoring: SPE Formation Evaluation, Paper SPE 20170, pp. 141-150, 1991.

Strack & Vozoff, Integrating long-offset transient electromagnetics (LOTEM) with seismics in an exploration environment, Geophysical Prospecting, vol. 44, pp. 997-1017, 1996.

Edwards & Yuan, The assessment of marine gas hydrates through electrical remote sounding: Hydrate without a BSR?, Geophysical Research Letters, vol. 27, No. 16, pp. 2397-2400, Aug. 15, 2000.

Hordt et al, A first attempt at monitoring underground gas storage by means of time-lapse multichannel transient electromagnetics. Geophysical Prospecting, vol. 48(3), pp. 489-509, 2000.

MacGregor, Marine controlled source electromagnetic sounding: Development of a regularised inversion for 2-dimensional resistivity structures, LITHOS Science Report, vol. 1, pp. 95-101, Apr. 1999.

Unsworth et al, Electromagnetic induction by a finite electric dipole source over a 2-D earth, Geophysics, vol. 58, pp. 198-214, 1993.

Flosadottir & Constable, Marine controlled-source electromagnetic sounding 1. Modelling and experimental design, Journal of Geophysical Research, vol. 101, No. B3, pp. 5507 to 5517, Mar. 10, 1996.

Yuan et al, Electromagnetic assessment of offshore methane hydrate deposits on the Cascadia margin, GP22A-08, American Geophysical Union Fall Meeting, San Francisco, 1998.

Edwards et al, Electromagnetic assessment of offshore methane hydrate deposits on the Cascadia margin, MARELEC 99, 1999.

MacGregor & Sinha, Marine controlled source electromagnetism: Effect of source-receiver geometry on the response of 1-D models, 1996.

MacGregor et al, Electromagnetic evidence for a crustal melt accumulation beneath the slow spreading Reykjanes Ridge, Abstract for 13th Workshop on EM induction in the earth.

MacGregor, Electromagnetic investigation of the Reykjanes ridge near 58 degrees North, PhD thesis, University of Cambridge.

Sinha et al, Evidence for accumulated melt beneath the slow-spreading mid-Atlantic ridge, Phil. Trans. R. Soc. Lond. A., vol. 355, pp. 233 to 253, 1997.

MacGregor et al, The RAMESSES experiment—III. Controlled-source electromagnetic sounding of the Reykjanes Ridge at 57°45'N, Geophys. J. Int, 135, 773-789, 1998.

MacGregor et al, Electrical resistivity structure of the Valu Fa Ridge, Lau Basin, from marine controlled-source electromagnetic sounding, Geophysical Journal International, vol. 146, pp. 217-236, Jul. 2001.

Applications of 3-dimensional electromagnetic induction by sources in the ocean, A proposal submitted to MAST III under Area C: Marine Technology, Part 1.

Applications of 3-dimensional electromagnetic induction by sources in the ocean, A proposal submitted to MAST III under Area C: Marine Technology, Part 2.

LITHOS Cambridge advanced lithological imaging project, Aug. 21, 1997.

MacGregor et al, Use of marine controlled source Electromagnetic Sounding for sub-basalt exploration, EAGE 61st Conference and Technical Exhibition, Apr. 2008, Helsinki, Finland, Jun. 1999.

Constable & Cox, Marine controlled source electromagnetic sounding 2. The PEGASUS experiment, Journal of Geophysical Research, vol. 101, No. B3, pp. 5519-5530, Mar. 10, 1996.

MacGregor, Lucy et al. "Electrical resistivity structure of the Valu Fa Ridge, Lau Basin, from marine controlled-source electromagnetic sounding." *Geophysical Journal International.* 146.1 (2001): 217-236.

Sinha, Martin C. "Controlled source EM sounding: Survey design considerations for hydrocarbon applications." *LITHOS Science Report.* (Apr. 1999): 95-101.

Edwards, Nigel R. "On the resource evaluation of marine gas hydrate deposits using sea-floor transient electric dipole—dipole methods." *Geophysics.* 62.1 (1997): 63-74.

Constable, S. et al. "Marine controlled-source electromagnetic sounding 2. The PEGASUS experiment." *Journal of Geophysical Research.* 101.B3 (1996): 5519-5530.

Garg, N.R. et al. "Synthetic electric sounding surveys over known oil fields." *Geophysics.* 49.11 (1984): 1959-1967.

\* cited by examiner

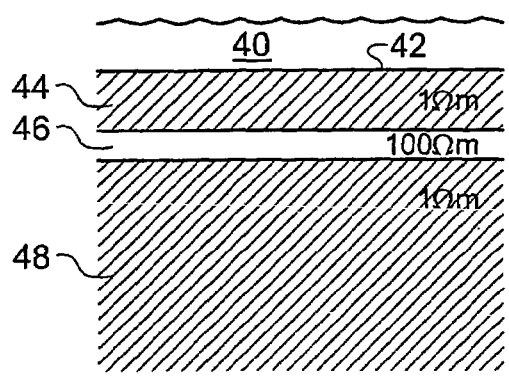
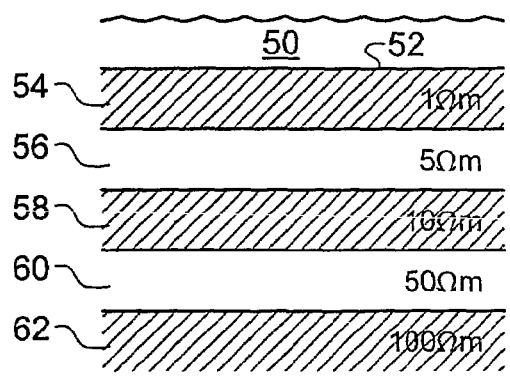
Fig. 4A
Fig. 4B
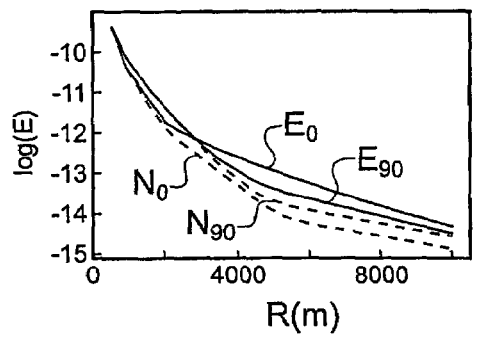
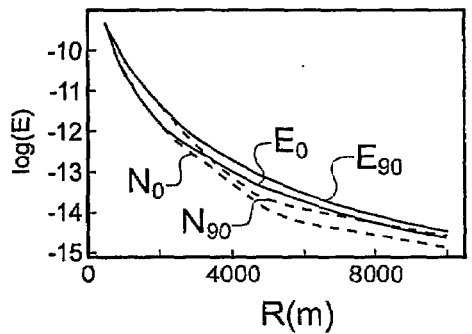
Fig. 4C
Fig. 4D
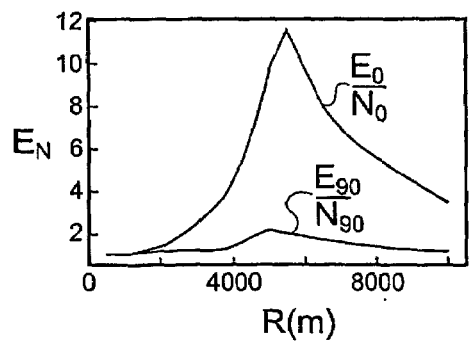
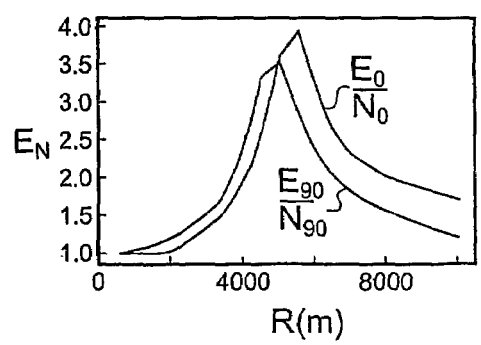
Fig. 4E
Fig. 4F

ELECTROMAGNETIC SURVEYING FOR HYDROCARBON RESERVOIRS

This application is a national phase of International Application No. PCT/GB02/05355 filed Nov. 28, 2002 and published in the English language.

BACKGROUND OF THE INVENTION

The invention relates to seafloor electromagnetic surveying for oil and other hydrocarbon reserves.

Determining the response of the sub-surface strata within the earth's crust to electromagnetic fields is a valuable tool in the field of geophysical research. The geological processes occurring in thermally, hydrothermally or magmatically active regions can be studied. In addition, electromagnetic sounding techniques can provide valuable insights into the nature, and particularly the likely hydrocarbon content, of subterranean reservoirs in the context of subterranean oil exploration and surveying.

Seismic techniques are often used during oil-exploration expeditions to identify the existence, location and extent of reservoirs in subterranean rock strata. Whilst seismic surveying is able to identify such structures, the technique is often unable to distinguish between the different possible compositions of pore fluids within them, especially for pore fluids which have similar mechanical properties. In the field of oil exploration, it is necessary to determine whether a previously identified reservoir contains oil or just aqueous pore fluids. To do this, an exploratory well is drilled to determine the contents of the reservoir. However, this is an expensive process, and one which provides no guarantee of reward.

Whilst oil-filled and water-filled reservoirs are mechanically similar, they do possess significantly different electrical properties and these provide for the possibility of electromagnetic based discrimination testing. A known technique for electromagnetic probing of subterranean rock strata is the passive magneto-telluric (MT) method. The signal measured by a surface-based electromagnetic detector in response to electromagnetic (EM) fields generated naturally, such as within the earth's upper atmosphere, can provide details about the surrounding subterranean rock strata. However, for deep-sea surveys, all but those MT signals with periods corresponding to several cycles per hour are screened from the seafloor by the highly conductive seawater. Whilst the long wavelength signals which do penetrate to the seafloor can be used for large scale undersea probing, they do not provide sufficient spatial resolution to examine the electrical properties of the typically relatively small scale subterranean reservoirs. Moreover, since MT surveying relies primarily on horizontally polarised EM fields, it is intrinsically insensitive to thin resistive layers.

Nonetheless, measurements of electrical resistivity beneath the seafloor have traditionally played a crucial role in hydrocarbon exploration and reservoir assessment and development. In industry, sub-seafloor resistivity data have generally been obtained almost exclusively by wire-line logging of wells. There are, though, clear advantages to developing non-invasive geophysical methods capable of providing such information. Although inevitably such methods would be unable to provide comparable vertical resolution to wireline logging, the vast saving in terms of avoiding the costs of drilling test wells into structures that do not contain economically recoverable amounts of hydrocarbon would represent a major economic advantage.

In research fields that are not of commercial interest, geophysical methods for mapping sub-seafloor resistivity variations by various forms of electromagnetic surveying have been under development for many years (e.g. Sinha et al., 1990; Evans et al., 1994). WO 00/13046 and WO 00/57555 make proposals for finding hydrocarbon reservoirs using such electromagnetic surveying.

SUMMARY OF THE INVENTION

The invention discloses a new approach for electromagnetic surveying to locate hydrocarbon layers. New source-detector geometries are used based upon an electromagnetic source.

According to a first aspect of the invention there is provided an electromagnetic survey method for surveying an area previously identified as potentially containing a subsea hydrocarbon reservoir, comprising: obtaining first and second survey data sets with an electromagnetic source aligned end-on relative to a first detector and aligned broadside relative to a second detector.

The terms source and detector are used interchangeably with transmitter and receiver respectively throughout this document.

The survey data from end-on and broadside alignments taken in combination allow the difference between galvanic and inductive contributions to the signals collected at the detector to be determined. Collecting survey data highlighting only the galvanic contribution in an end-on geometry is not reliable. As is demonstrated in the examples given below, it is generally impossible to differentiate between a rock formation containing a hydrocarbon reservoir and one which does not contain a hydrocarbon reservoir by studying the end-on survey data alone. The previously proposed electromagnetic survey methods for finding hydrocarbon reservoirs are thus believed to be at best highly unreliable.

The end-on survey data are sensitive to the presence of resistive hydrocarbon layers (exploiting largely galvanic effects and vertical components of induced current flow). By contrast, the broadside survey data are sensitive to the larger scale structure, but relatively insensitive to resistive hydrocarbon layers (exploiting the dominantly inductive effects). The reason why collection of survey data from the broadside geometry is essential for reliable electromagnetic surveying is that many features other than hydrocarbon reservoirs can affect the resistivity beneath the seafloor and the results of a survey. For example, resistivity often increases steadily with depth in submarine sedimentary basins, due to the progressive expulsion of pore fluids by rising overburden pressure. Such a resistivity profile will produce effectively the same response in the end-on survey data, as would presence of a hydrocarbon layer. Comparative examples given below demonstrate this effect.

In the preferred implementation of the survey of the first aspect of the invention, the end-on and broadside alignments correspond to an arrangement of the electromagnetic source and the first and second detectors in which a right angle is formed between a first line leading from the first detector to the source and a second line leading from the second detector to the source, and wherein the source has its dipole axis aligned along the first line. However, in practice, an only approximate satisfaction of this condition will not greatly reduce the quality of the collected survey data. In any case, this ideal condition will not be satisfied exactly in practice, since the source is typically moved during surveying, being in the form of an antenna towed by an unmanned submarine craft. It would also be possible to obtain useable data if the above-mentioned right angle was changed to an angle away from 90 degrees, for example anywhere from 45–135 degrees may be satisfactory. How much the quality of the data deteriorates as the survey geometry moves away from right angles has not been studied, although this would be straightforward to do using the modelling techniques described herein.

With the first aspect of the invention, the first and second survey data sets are preferably obtained concurrently. This can be achieved during a single tow of the electromagnetic source. The data collected by the detectors can then be time-synchronised to the same absolute clock.

According to a second aspect of the invention there is provided an electromagnetic survey method for surveying an area previously identified as potentially containing a subsea hydrocarbon reservoir, comprising: obtaining first and second survey data sets with an electromagnetic source aligned end-on and broadside respectively relative to a first detector.

The method of the second aspect of the invention thus differs from that of the first aspect in that a single detector can be used to collect both the end-on and broadside survey data. This can be done by towing the source twice, once in a direction along the line connecting the source to the detector, and again in a direction transverse thereto. Namely, the first and second survey data sets can be obtained consecutively. The relative alignment between the source and detector when the end-on and broadside survey data are collected can be varied in the same way as discussed above in relation to the first aspect of the invention. In other words, it is best if the dipole is aligned along a line connecting the source and detector when the end-on survey data is collected, and aligned perpendicular to that line when the broadside survey data is collected. However, deviations from that condition will occur and can be tolerated.

It will also be understood that the first survey data set can be obtained before or after second data survey set using the same electromagnetic source.

In principle, the first and second survey data sets could be obtained with separate sources carried by different transmitters, in which case the data sets could be obtained concurrently. However, in practice, it is likely that only a single source will be deployed and the first and second data sets will thus be obtained one after the other.

According to a third aspect of the invention there is provided a method of analysing results from an electromagnetic survey of an area potentially containing a subsea hydrocarbon reservoir, comprising: providing first and second survey data sets obtained from an electromagnetic source aligned respectively end-on and broadside relative to a detector; and combining the first and second survey data sets to obtain a results data set that represents a difference between the end-on and broadside alignments.

The method can be greatly improved by normalising each of the first and second survey data sets relative to respective first and second normalisation data sets or functions specific to the end-on and broadside alignments respectively, prior to the combining.

The first and second normalisation data sets or functions can be calculated from a rock formation model, or from the first and second survey data sets.

In a preferred embodiment, the first and second data sets each comprise radial and azimuthal components of electric field or magnetic field measured at the detector, and the method further comprises: transforming the radial and azimuthal components into at least one polarisation ellipse parameter, prior to the combining. The polarisation ellipse parameter(s) can be the amplitude and/or phase of the component of the electric field or magnetic field aligned along a major axis of the ellipse.

The method may advantageously further comprise: visually representing the results data set in a plot of at least two dimensions corresponding to the survey area. The visual representation can be a two-dimensional (2D) plot in plan view, or a three-dimensional (3D) plot including depth, e.g. a perspective view of the survey area.

The plot may include markings of areas of equal or similar electromagnetic field strength. These markings could be contour lines, or colour or grey scale gradations with one colour or grey tone being used for a range of electromagnetic field strength values. Stepwise colour gradation is used in the preferred embodiment, with each colour representing a defined range of data values.

When the plot is of normalised survey data it is helpful if the plot also includes lines of equal absolute electromagnetic field strength, showing how the signal strength has decayed as one moves away from the source. The lines, which may appear as contours, can be labelled with either a relative or absolute decay value.

According to a fourth aspect of the invention, there is provided a method of planning an electromagnetic survey of an area identified as potentially containing a subsea hydrocarbon reservoir, comprising: creating a model of the area to be surveyed, including a rock formation containing a hydrocarbon reservoir and a body of water above the rock formation; setting values for water depth, depth below the seafloor of the hydrocarbon reservoir, and resistivity structure of the rock formation; performing a simulation of an electromagnetic survey in the model of the survey area by calculating first and second survey data sets for an electromagnetic source aligned end-on and broadside relative to a detector; and combining the first and second survey data sets to obtain a results data set that represents a difference between the end-on and broadside alignments.

In typical use, the simulation will be repeated for a number of source frequencies and/or source-to-detector distances, and/or other parameters which can be varied during a survey. This iterative procedure can be used in order to select optimum surveying conditions in terms of source frequency and source-to-detector distance for probing the hydrocarbon reservoir. By optimum, it is not necessarily meant that the best survey conditions are found, but only that a set of survey conditions is found which will provide strong, unmistakable indications in the case that there is a hydrocarbon reservoir at the survey site. The iterative procedure may be purely under manual control. However, preferably, the simulator can allow the user the option of automatically optimising the survey conditions. The user can then switch between manual and automated iteration as desired.

The model should preferably include a body of air above the body of water, so that the simulation can take account of signal propagation paths including the body of air when calculating the first and second survey data sets. The propagation path through the air (the 'air wave') will in fact dominate for shallower water and longer distances between source and detector(s), as will be apparent from the examples described further below. For deep water and shorter detector-source distances the effect is less important and may be omitted from the model.

The method preferably further comprises: normalising each of the first and second survey data sets relative to respective first and second normalisation data sets or functions specific to the end-on and broadside alignments respectively, prior to the combining. The first and second normalisation data sets or functions can be calculated from a rock formation model, for example.

The method preferably further comprises visually representing the results data set in a plot of at least two dimensions corresponding to the survey area. The visual representation can be a 2D plot in plan view, or a 3D plot including depth, e.g. a perspective view of the survey area. The other comments made above in relation to the plots of the third aspect of the invention also apply to the fourth aspect of the invention.

Another aspect of the invention relates to a computer program product bearing machine readable instructions for implementing the method of analysing results from an electromagnetic survey according to the third aspect of the invention.

Another aspect of the invention relates to a computer apparatus loaded with machine readable instructions for implementing the method of analysing results from an electromagnetic survey according to the third aspect of the invention.

Another aspect of the invention relates to a computer program product bearing machine readable instructions for implementing the method of planning an electromagnetic survey according to the fourth aspect of the invention.

Another aspect of the invention relates to a computer apparatus loaded with machine readable instructions for implementing the method of planning an electromagnetic survey according to the fourth aspect of the invention.

BRIEF DESCRIPTION OF THE DRAWINGS

For a better understanding of the invention and to show how the same may be carried into effect reference is now made by way of example to the accompanying drawings.

FIG. 4A shows a schematic section view of a model subterranean strata configuration containing a hydrocarbon reservoir.

FIG. 4B shows a schematic section view of a model subterranean strata configuration containing layers of increasing resistivity.

FIG. 4C is a graph showing the electric field strength ($E_0$, $E_{90}$) as a function of distance from the source for two different detector positions for the subterranean strata shown in FIG. 4A. Also shown are the normalising signals ($N_0$, $N_{90}$) expected from a uniform subterranean strata configuration.

FIG. 4D is a graph showing the electric field strength ($E_0$, $E_{90}$) as a function of distance from the source for two different detector positions for the subterranean strata shown in FIG. 4B. Also shown are the normalising signals ($N_0$, $N_{90}$) expected from a uniform subterranean strata configuration.

FIG. 4E is a graph showing the electric field strengths ($E_0$, $E_{90}$) shown in FIG. 4C normalised by the normalising field strengths ($N_0$, $N_{90}$) shown in the same.

FIG. 4F is a graph showing the electric field strengths ($E_0$, $E_{90}$) shown in FIG. 4D normalised by the normalising field strengths ($N_0$, $N_{90}$) shown in the same.

DETAILED DESCRIPTION

Figure 1:
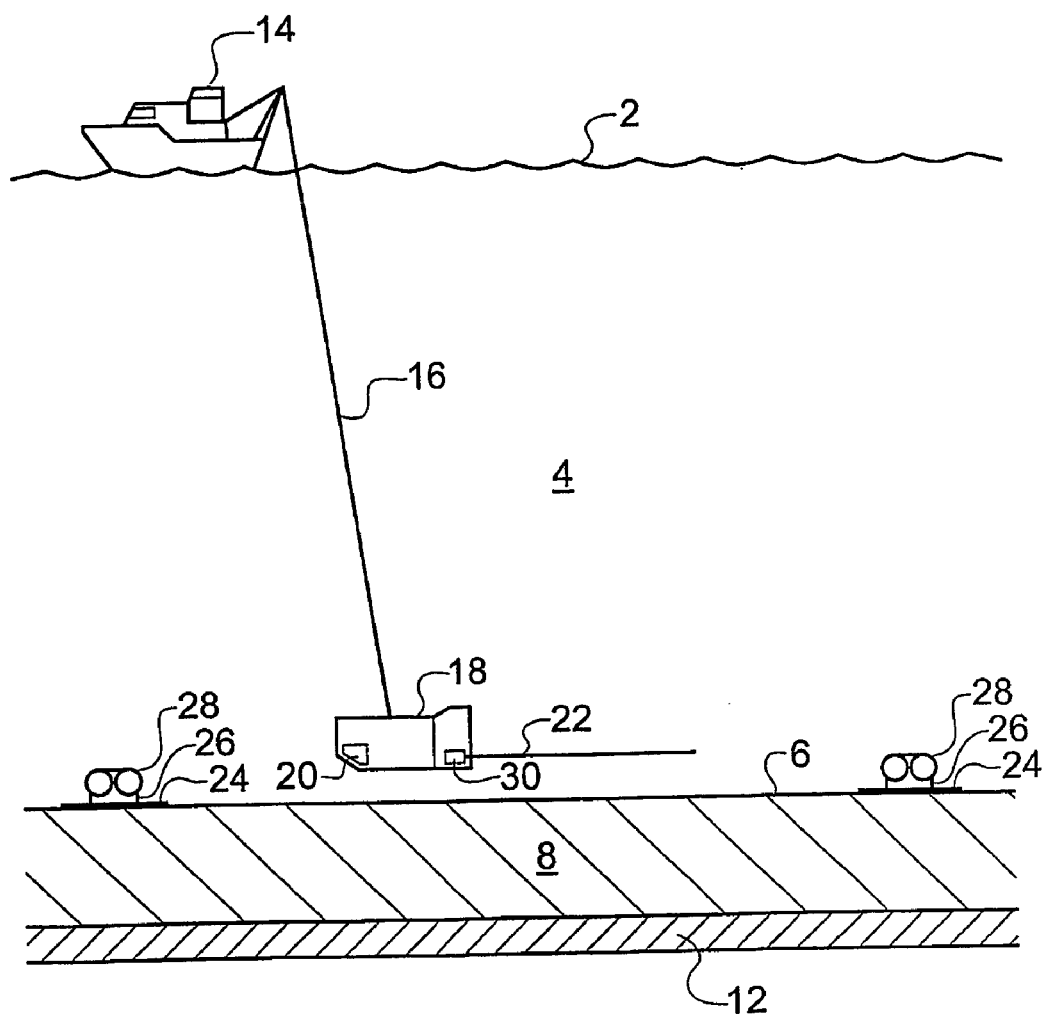
FIG. 1 shows a schematic representation of an exploratory EM sounding survey.

FIG. 1 of the accompanying drawing shows schematically a surface vessel 14 undertaking EM sounding of subterranean rock strata 8 within which a hydrocarbon reservoir 12 is located. The surface vessel 14 floats on the surface 2 of the sea 4. A deep-towed vehicle 18 is attached to the surface vessel 14 by an umbilical cable 16 which provides an electrical, optical and mechanical connection between the deep-towed vehicle 18 and the surface vessel 14. The deep-towed vehicle 18 is towed by the surface vessel 14 such that it remains consistently close to the seafloor 6. This is facilitated by an echo-location package 20 which relays information about the height of the deep-towed vehicle 18 above the seafloor 6 to the surface vessel 14. The deep-towed vehicle 18 receives electrical power from the ship's on-board power supply via the umbilical cable 16.

A cycloconverter unit 30 generates the chosen waveform to be supplied to an EM source in the form of a transmitting antenna 22 which is towed by the deep-towed vehicle 18. The transmitting antenna 22 broadcasts the EM signal into the sea 4, and this results in a component passing through the rock strata 8. One or more remote instrument packages 26 record the signal received by receiving antennae 24 in response to the transmitted EM signal. If the separation of the transmitting antenna 22 and the receiving antenna 24 is greater than a few hundred meters, the highly conductive seawater strongly attenuates the direct signal between them. The components of the EM signal that have travelled through the rock strata 8 and the reservoir 12 dominate the received signal and provide information about the electrical properties of these regions. At the end of the sounding experiment, a remotely operable release system allows the instrument package 26 to be detached from a ballast weight (not shown) so that an in-built flotation device 28 can carry the instrument package 26 to the surface 2 for recovery and retrieval of data for inversion analysis.

The transmitting antenna 22 emits signals that propagate outwards both into the overlying water column 4 and downwards into the seafloor 6 and the underlying strata 8, 12. In both cases, at practical frequencies for this method and given the typical resistivity of the media 4, 8, 12, propagation occurs by diffusion of electromagnetic fields. The rate of decay in amplitude and the phase shift of the signal are controlled both by geometric spreading and by skin depth effects. Because in general the underlying strata 8, 12 are more resistive than seawater 4, skin depths in the underlying strata 8, 12 are longer. As a result, electric fields measured at the seafloor 6 by a receiving antenna 24 at a suitable horizontal range are dominated by the components of the source fields which have propagated downwards through the seafloor 6, along within the underlying strata 8, 12, and back up to the receiving antenna 24. Both the amplitude and the phase of the received signal depend on the resistivity structure of the underlying strata 8, 12—and so, in principal, a survey consisting of many transmitter (source) and receiver (detector) locations can provide a multi-dimensional image, by geophysical inversion, of sub-seafloor resistivity.

The technique described here exploits the large resistivity contrast that exists between a hydrocarbon reservoir (typically tens of Ωm or higher) and the over- and under-lying sediments (typically ~2 Ωm or less). Such a contrast has a detectable influence on controlled source electromagnetic data collected at the seafloor 6 above the reservoir 12. The effect of the reservoir is most detectable in controlled source electromagnetic data at an appropriate frequency, and if the horizontal range from source 22 to receiver 24 is of the order of 2 to 5 times the depth of burial of the reservoir 12 in typical situations.

This following text describes specific geometric and data reduction approaches that allow the effect of a hydrocarbon reservoir on the outcome of a controlled source electromagnetic survey to be detected and analysed in practice.

Use of a Mobile Source and Multiple Fixed Receivers

In order to achieve a satisfactory survey outcome, it is essential to make controlled source electromagnetic measurements over a broad range of survey geometries—in other words, many transmitting locations and many receiving locations. The transmitter, i.e. the transmitting antenna, requires significant power to drive it, of the order tens of kilowatts or greater for signals detectable at ranges of several kilometres. It must therefore be connected by an umbilical cable 16 to the survey vessel 14 and this makes it relatively straightforward to make the transmitter mobile. It can then be towed in an appropriate survey pattern from the surface survey vessel 14. Since in many situations surveys of this kind are liable to take place over areas of the seafloor 6 where sensitive engineering installations exist or are planned, there are significant advantages to using a transmitter which does not physically come into contact with the seafloor 6. Provided that the separation between the transmitting antenna 22 and the seafloor 6 is small compared to a skin depth of the investigating field in seawater, the survey can still be completed satisfactorily. As a result, the most appropriate form of transmitter to use for this type of survey is one in which a neutrally buoyant horizontal electric dipole antenna 22 is towed behind the deep-towed vehicle 18 at a height of a few metres to a few tens of metres above the seafloor 6.

In the case of the receivers, there is an important advantage in using a static recording device. It is necessary to measure the alternating electric or magnetic field at the seafloor 6, resulting from the signal emitted by the transmitter. In typical applications, the signal-to-noise ratio of the received signal will be critical to the success and resolution of the survey, and so must be maximised. Moving the receiver inevitably generates noise, whether the signal measured is magnetic or electric field. In the case of electric fields, any motion of the receiver through the conducting seawater medium 4 in the presence of earth's geomagnetic field will generate an electromotive force across the receiving antenna 24. Receiver movements will therefore map into spurious electric field signals in the recorded data. In the case of magnetic field recordings, there are also significant disadvantages to moving the receiver. Most importantly, if vector rather than scalar magnetometers are used (i.e. measuring individual directional components of the magnetic field), any variation in the orientation of the receiving antenna 24 will again lead to significant spurious signals, since the magnetic detecting element will detect changes in the component of the geomagnetic field aligned with it. As a consequence of these two effects, any translational movement of an electric field sensor or rotational movement of a magnetic field sensor will result in contamination of the received signal by motionally induced noise.

For these reasons, it is desirable to carry out a controlled source electromagnetic survey to investigate or detect the presence of buried hydrocarbons using a combination of a mobile horizontal electric dipole source, equipped with a neutrally buoyant streamed antenna 22 and operated just above the seafloor 6; and an array of electric and/or magnetic field sensing receivers 24 placed statically on the seafloor 6 as shown in FIG. 1. The receiving instruments 26 can be recovered using acoustically actuated release mechanisms to separate them from their ballast weights, allowing them to return to the sea surface for recovery, following standard oceanographic and marine geophysical practice.

The Effects of Propagation Through the Atmosphere

There is an important additional factor that is crucial to the success or otherwise of the technique described here. In shallow water depths, it is possible for signals from the transmitter to follow a propagation path upwards through the water column to the surface; horizontally through the air; and back down through the water column to the seafloor receiver. This 'air wave' component contains no information about the sub-seafloor resistivity. It tends to dominate the received signal in shallow water and at long source-to-receiver offsets. The effect of the air wave can be minimised by choosing appropriate transmission frequencies, and by targeting surveys on prospects in deep water and in which the target is at a relatively shallow depth below the seafloor.

Figure 2A:
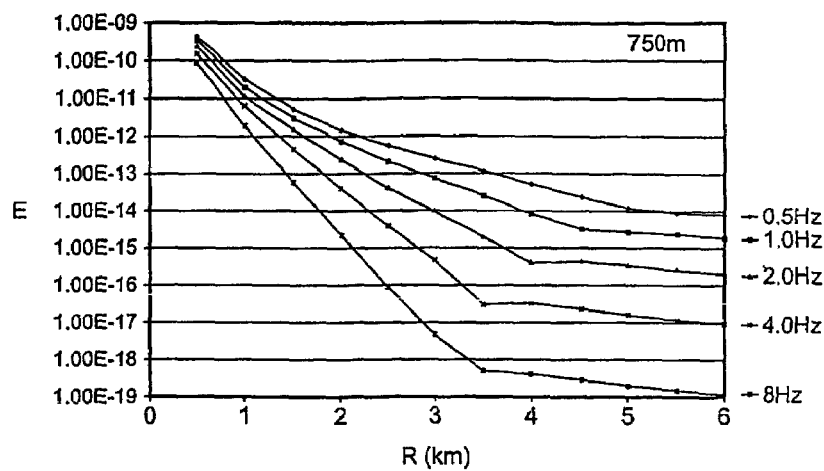
FIG. 2A is a graph showing the modelled electric field strength as a function of distance from, and along the axis of, the EM source. This is shown for several frequency components. The modelled sea depth is 750 m.
Figure 2B:
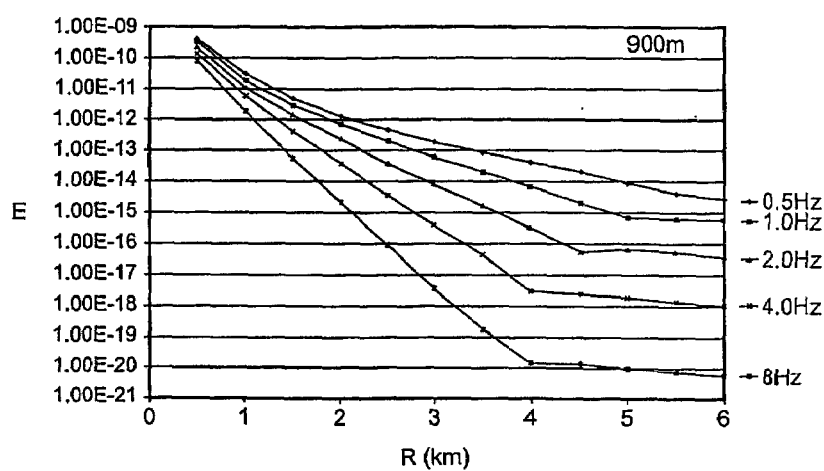
FIG. 2B is a graph showing the modelled electric field strength as a function of distance from, and along the axis of, the EM source. This is shown for several frequency components. The modelled sea depth is 900 m.
Figure 2C:
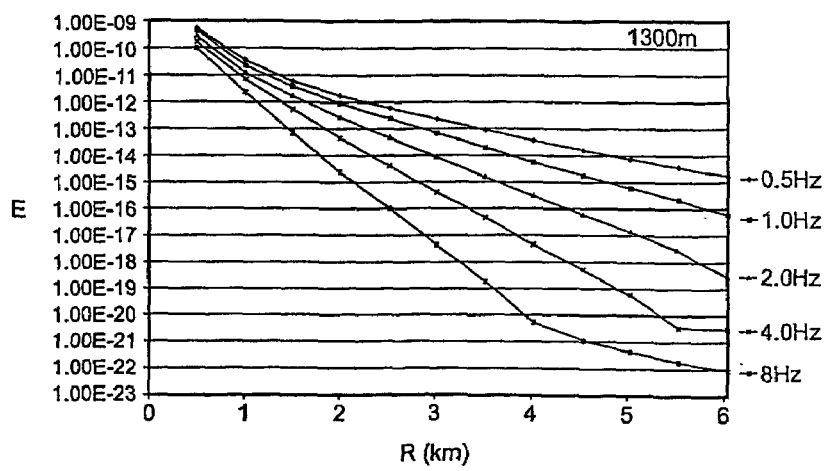
FIG. 2C is a graph showing the modelled electric field strength as a function of distance from, and along the axis of, the EM source. This is shown for several frequency components. The modelled sea depth is 1300 m.

FIGS. 2A, 2B and 2C show three cases of one-dimensional (1D) modelling showing signal amplitude as a function of source to receiver range and frequency. Each of the figures corresponds to a different depth of seawater overlying the seafloor.

FIG. 2A shows the modeled decay of electric field strength E as the distance R between the source (transmitter) and detector (receiver) increases. The detector is separated from the receiver along a line which runs parallel to, and passes through the transmitting dipole source. The model survey is undertaken above a semi-infinite subterranean strata of uniform resistivity 1 Ωm, and in seawater of depth 750 m. The decay is shown for five different electromagnetic frequency components ranging from 0.5 Hz to 8 Hz.

FIG. 2B represents the results of a similar modelling to that shown in FIG. 2A, but for a seawater depth of 900 m.

FIG. 2C represents the corresponding results for a seawater depth of 1300 m.

On all three sets of curves shown in FIGS. 2A, 2B and 2C, amplitude decreases rapidly with range, as expected. Additionally, amplitudes at a given range decrease with increasing frequency. This is because higher frequencies have shorter skin depths, and so experience increased attenuation. On each curve, the break in slope to a distinctly shallower gradient on the graph indicates the emergence of the air wave as the dominant signal at the receiver. For example, the curve corresponding to a signal component at 4 Hz shown in FIG. 2B shows that the air wave becomes important in seawater of depth 900 m and using a 4 Hz source transmission frequency when the detector is more than about 3.5 km away from the source. It can be seen that this becomes an increasing problem in shallow water and at higher frequencies. For the technique described here to work most efficiently, the signal at the receiver must be primarily due to propagation through the seafloor, and not due to the air wave. For instance, for this condition to be met at 5 to 6 km source-detector offset for the model subterranean strata described above, the frequency used for the survey should be no higher than 1 Hz in 1300 m water depth, or 0.5 Hz in 900 m water depth.

Modelling can thus be used to plan a survey in order to determine the maximum distance allowable between source and detectors for various frequencies. Suitable detector deployment positions and source frequency ranges can thus be determined in advance of performing a survey.

The Use of Survey Result Parameters Derived from Polarisation Ellipse Analysis

Use of a horizontal electric dipole antenna produces electromagnetic fields at the seafloor that can be measured using electrometers or scalar or vector magnetometers. Scalar magnetometers are not used widely in practice. Current practice is to measure two or more orthogonal components of either electric or magnetic field. Up to six channels of data can usefully be recorded by the receiving instruments, corresponding to three orthogonal directional components each of electric and magnetic field. For operational reasons of instrument complexity and data storage, in most cases a sub-set of these is recorded.

The commonest arrangement currently is to use an orthogonal pair of horizontal electric dipole receiving elements in each receiving instrument. In the horizontal plane, the transmitter generates both radial and azimuthal components of electric field at the receiver, and, since these have different amplitudes and phases in general, the electric field at the seafloor from a harmonic transmitter maps out a polarisation ellipse in the horizontal plane. The same applies in the case of horizontal magnetic field; and if vertical components are included, the planar ellipse becomes a polarisation ellipsoid.

A straightforward approach to analysing controlled source electromagnetic data is to resolve the observed fields into radial and azimuthal components. However this suffers from contamination of field values by errors arising from small inaccuracies in source and receiver orientation and position. As an alternative, we therefore propose the novel approach of analysing the data from the recorded components in terms of polarisation ellipse properties—e.g. the amplitude and/or phase of the component of the signal aligned along the major axis of the ellipse. Since this value is much less dependent on the accuracy of the source and receiver positioning—and in particular removes the significant errors that arise from even small uncertainties in receiver orientation—use of polarisation ellipse values can lead to smaller uncertainties in measured field properties at the receiver. We show below as an example that use of the amplitude along the major axis of the polarisation ellipse for horizontal electric field can be used as a robust measurement parameter for detecting the presence of buried hydrocarbon layers. In principle, other polarisation ellipse parameters can be used in a similar way. Parameters that could readily be measured include amplitude or phase along the major axis; the horizontal polarisation ellipse of either electric or magnetic field; or in either case a polarisation ellipsoid including a vertical component.

Presentation of Survey Results Using Normalised Values

As seen in FIGS. 2A, 2B and 2C above, a feature of a controlled source electromagnetic survey over a sedimented seafloor is that the received field amplitude drops very rapidly with increasing range. The received signal properties also depend on the orientations of the source and receiving dipoles. In a typical survey, the signal amplitude is likely to vary by several orders of magnitude over the useful set of source-detector (transmitter-receiver) offsets; while the phase lag of the received signal also increases steadily with increasing offset. The effects of buried structure beneath the survey show up as deviations in the signal from that which would be expected if the sub-surface consisted only of a homogeneous, isotropic half space.

In order to visualise more clearly the effects of buried structure on controlled source electromagnetic signal properties, it is convenient to normalise the observed signals with respect to some reference model. A simple model to use would consist of a water layer of finite thickness above the survey of the true depth; and a homogeneous isotropic half space representing the seafloor below the survey. If appropriate, and if the relevant a priori information is available, a more complex reference model may be used, although it is desirable to use always the simplest reference model that can broadly represent the large scale background properties of the seafloor.

The normalisation is carried out for amplitude by dividing the observed field by that calculated for the reference model, using the same source-detector geometry as for the observed data. In the case of phase, the normalisation is carried out by subtracting the phase lag calculated for the reference model from that of the observed data. We show below that use of normalised values calculated in this way can dramatically enhance the visual presentation of controlled source electromagnetic data from a survey over a hydrocarbon reservoir. Our illustrations use normalised amplitudes, but normalised phases could equally be used.

As an alternative, normalisation could be based on the survey data itself, for example using data collected adjacent to the target.

The Varying Physical Response of a Survey Depending on Source Orientation Geometry Overall, the most crucial factor for the success or otherwise of the controlled source electromagnetic technique in practical applications related to hydrocarbon reservoirs is related to survey geometry.

Figure 3:
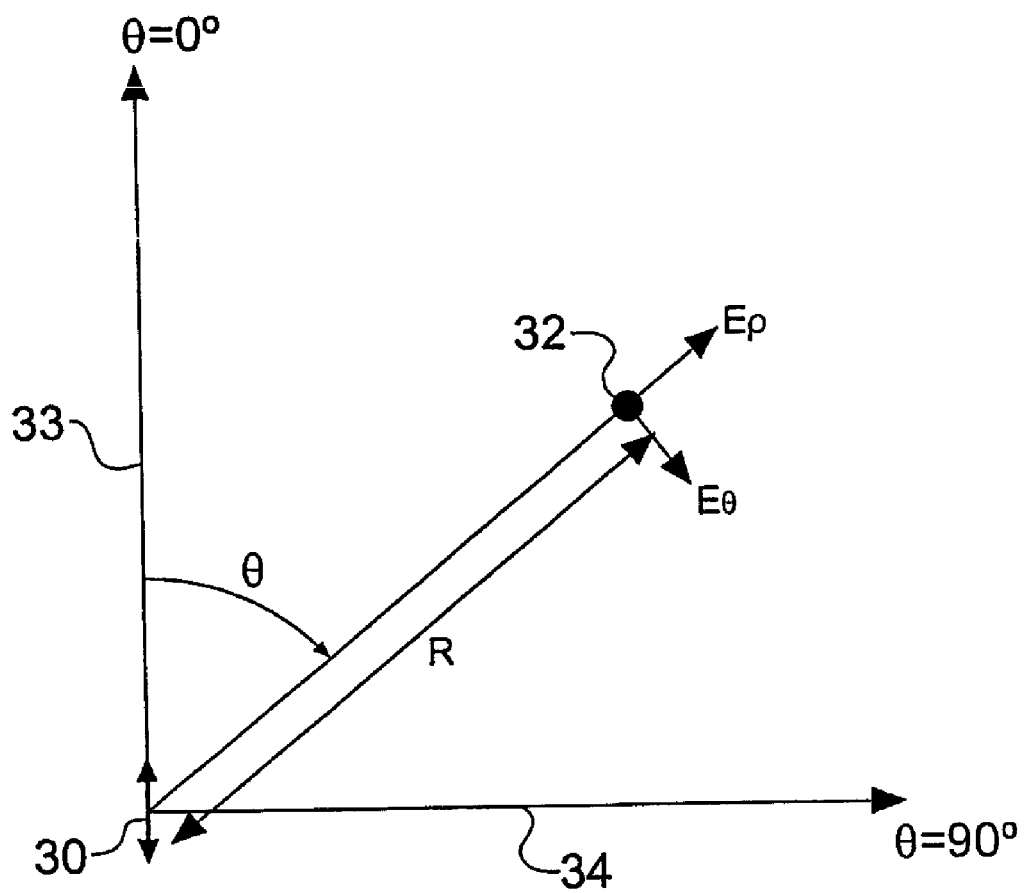
FIG. 3 is a schematic plan view defining a survey geometry coordinate system.

FIG. 3 is a schematic plan view from above illustrating a suitable co-ordinate system for describing the relative placement of a controlled source electromagnetic source 30 and an electromagnetic detector 32. The position of the detector 32 with respect to the source 30 is most suitably described in polar co-ordinates, with the centre of the source 30 providing the origin of the polar co-ordinate system. The position of the detector 32 is defined by an azimuthal angle $\theta$ and a distance R. The detector 32 and source 30 are considered to be co-planar. The angle $\theta$ is measured clockwise from a line 33 passing through, and running parallel to, the source axis, as indicated in FIG. 3 by the line marked $\theta=0°$. A detector placed along the line 33, i.e. such that is has an azimuthal angle $\theta$ of $0°$, is referred to as being in an end-on position. A detector with an azimuthal angle θ of 90°, such that it lies on the line 34 marked θ=90° in FIG. 3, is referred to as being in a broadside position. The electric field strength at the detector is considered in terms of a radial component $E_\rho$ and an orthogonal azimuthal component $E_\theta$ as indicated in FIG. 3.

Depending on the relative placements and orientations of sources and receivers, the physics of propagation of the signal through the seafloor—and so the net effect on the properties of the received signal—can be more or less sensitive to different classes of sub seafloor structure. As a simple illustration of this in the context of hydrocarbon surveys, we consider a case in which the sub-seafloor structure can be represented by a simple stack of horizontal layers (a useful first approximation for many situations in sedimentary basins).

FIG. 4A shows in schematic vertical section an exemplary subterranean strata configuration. A section of seafloor 42 lies beneath 800 m of seawater 40. The strata beneath the seafloor 42 comprise a 1 km thick overburden layer 44, representing sediments above a hydrocarbon reservoir layer 46. This overburden layer 44 has low resistivity, primarily due to aqueous saturation of pore spaces. The middle layer 46 corresponds to a 100 m thick hydrocarbon reservoir and has a resistivity perhaps 100 times greater than the overburden 44. This is due to the presence of the non-conducting hydrocarbon occupying much of the pore spaces. Below the hydrocarbon reservoir layer 46 is a sub-reservoir region 48 which has low resistivity due to its similarity to the overburden layer 44 and extends downwards for an effectively infinite distance.

In the case of an electromagnetic survey, we can consider the differing behaviours of electric currents generated by the source resolved along horizontal and vertical directions. The relationships between the electric currents flowing in two adjacent regions of space are determined by both galvanic (i.e. direct transfer of charge) and inductive effects. Since charge is conserved, current leaving one volume of the sub-surface strata 44, 46, 48 and arriving in an adjacent volume along the direction of current flow are related to each other by a galvanic mechanism. On the other hand, if two volumes are close together but separated from each other along a direction orthogonal to current flow, then the coupling between the currents flowing in the two volumes will be primarily inductive.

Applying this to our model of a sub-seafloor structure shown in FIG. 4A, we can infer that the effect of the thin but resistive hydrocarbon reservoir layer 46 on the survey results will depend strongly on the direction of flow of the currents generated by the source. If the current at the base of the overburden layer 44 is dominantly horizontal, then coupling between this layer and the deeper layers 46, 48 will be dominated by inductive effects. Although little current will flow in the hydrocarbon reservoir layer 46, the inductive coupling between the overburden 44 and the underlying layer 48 will be only mildly affected. Currents in the two conducting layers 44, 48 (overburden and underlying layers) will therefore be similar to the case without a hydrocarbon reservoir layer 46. The results of such a survey will therefore be only weakly affected by the presence of the hydrocarbon reservoir layer 46.

In contrast, if our survey generates significant vertical components of electric current flow in the overburden layer 44, then galvanic effects along the current path will be strongly affected by the thin resistive hydrocarbon reservoir layer 46. The resistive hydrocarbon reservoir layer 46 will tend to block the current flow. As a result, currents flowing in the deeper layer 48 will be much reduced; and the overall pattern of current flow in the overburden layer 44 will therefore be significantly altered. In such a survey situation, the presence of the hydrocarbon will significantly influence the outcome.

Hence it becomes of paramount importance in designing a practical survey approach for detecting buried hydrocarbon reservoirs to distinguish between source (transmitter) and detector (receiver) geometries in which coupling between layers is largely inductive between current sheets in a horizontal plane (in which case the survey has little sensitivity to the presence of the reservoir); and those in which a significant component of vertical current flow occurs, in which case blocking of the passage of this current flow by the reservoir leads to a survey which is strongly sensitive to the presence of the reservoir.

A Specific Approach to Combining Two Contrasting Source Geometries when Prospecting for Hydrocarbon Filled Reservoirs By selecting a suitable survey geometry, it is possible to exploit the diverse properties of electromagnetic induction outlined above, by designing a survey in such a way that it provides data that are sensitive to the presence of thin resistive layers (exploiting largely galvanic effects and vertical components of induced current flow); while simultaneously obtaining data that are more sensitive to the much larger scale structure, but relatively insensitive to a thin hydrocarbon layer (exploiting the dominantly inductive effects). The reason why the latter component is essential is that many features other than hydrocarbon reservoirs can affect the resistivity beneath the seafloor and the results of a survey. For example, resistivity often increases steadily with depth in submarine sedimentary basins, due to the progressive expulsion of pore fluids by rising overburden pressure.

FIG. 4B shows in vertical section a highly schematic exemplary subterranean strata configuration which exhibits increasing resistivity with depth. A section of seafloor 52 lies beneath 800 m of seawater 50. The strata beneath the seafloor 52 comprise a series of layers of sediment of increasing resistivity. A first layer 54 has a uniform resistivity of 10 Ωm and a thickness of 1 km. A second layer 56 has a uniform resistivity of 5 Ωm and a thickness of 1 km. A third layer 58 has a uniform resistivity of 10Ωm and a thickness of 1 km. A fourth layer 60 has a uniform resistivity of 50 Ωm and a thickness of 1 km. Beneath the fourth layer 60 is a fifth layer 62 which has a resistivity of 100 Ωm and extends downwards for an infinite extent.

The increasing resistivity indicated in FIG. 4B leads to longer skin depths, and hence to larger observed amplitudes and smaller observed phase lags for all detector placements. Although this does not exactly reproduce the same galvanic effects of a thin resistive layer, the overall effect on observed fields in the end-on geometry is likely to be very similar to (and difficult or impossible to distinguish from) the effect of a hydrocarbon reservoir. Designing a survey in such a way that different parts of the resulting data are more or less sensitive to the presence of certain key features is essential for removing ambiguity in the interpretation.

Recent studies of volcanic systems at mid-ocean ridges and of sediments beneath resistive basalt layers (MacGregor et al., 1998, 2001; MacGregor & Sinha, 2000) have demonstrated that improved model resolution and reduced interpretational ambiguity can be achieved by using received electric field components from two distinct source-detector geometries. This approach is now applied to the case of surveying for thin hydrocarbon reservoirs.

FIGS. 4C, 4D, 4E and 4F show survey simulation results for the two subterranean strata configurations shown in FIGS. 4A and 4B. The method relies on collecting survey data using two distinct geometric modes. The first mode corresponds to an end-on geometry, in which, as described above, the receiver lies along the axis of the transmitting dipole. The source-detector azimuth θ as defined in FIG. 3 is 0°, and the field observed at the receiver is dominated by the radial component $E_\rho$. The second mode corresponds to a broadside geometry, in which, as described above, the source-detector azimuth θ is 90°, and the field observed at the receiver is dominated by the azimuthal component $E_\theta$.

For the case of hydrocarbon exploration, where the target is a thin resistive layer embedded between a more conductive underburden and overburden, such as that shown schematically in FIG. 4A, the received signal depends on the azimuthal angle θ of the detector. Because of the transmitter field pattern, the end-on, or $E_\rho$, geometry results in a significant contribution to the observed field at the seafloor by the vertical component of current flow. The broadside, or $E_\theta$, geometry results in fields at the seafloor that are more dependent on the contribution of inductively coupled currents flowing in horizontal planes. As a result, the presence of a resistive hydrocarbon reservoir layer produces a significant increase at certain ranges in the end-on ($E_\rho$) fields, while having virtually no effect on the broadside ($E_\theta$) fields. The result is 'splitting' of amplitudes between the two modes, and this splitting is characteristic of a structure in which resistivity first increases, in this case due to a hydrocarbon layer, and then decreases with depth.

FIG. 4C is a graph showing the modelled amplitudes of electric field E along the major axes of the horizontal polarisation ellipses for two source-detector geometries and as a function of distance R between source and detector. These are determined for the model of sub-seafloor structure indicated in FIG. 4A. Four curves are shown. The curve labelled $E_0$ shows the field strength as a function of distance for end-on geometries, the curve labelled $E_{90}$ shows the same for broadside geometries. The curves labelled $N_0$ and $N_{90}$ are the corresponding normalisation curves. These are determined for the same geometries as for $E_0$ and $E_{90}$, but represent the modelled amplitudes of electric field along the major axes of the horizontal polarisation ellipses where the subterranean strata comprise a homogeneous isotropic half space of resistivity 1 Ωm, such as previously described.

FIG. 4D is a graph showing the set of curves which correspond to those curves shown in FIG. 4C, but for the subterranean strata configuration shown in FIG. 4B.

FIG. 4E is a graph showing the normalised values of the fields $E_0$ and $E_{90}$ shown in FIG. 4C. These fields have been normalised by the fields $N_0$ and $N_{90}$, also shown in FIG. 4C, as discussed above.

FIG. 4F is a graph showing the normalised values of the fields $E_0$ and $E_{90}$ shown in FIG. 4D. These fields have been normalised by the fields $N_0$ and $N_{90}$, also shown in FIG. 4D, as discussed above.

It can be seen in FIG. 4E that the presence of the reservoir has relatively little effect on the broadside amplitudes (i.e. the curve labelled $E_{90}/N_{90}$ is close to unity), but that between 4 and 6 km offset, it produces a substantial increase in the end-on amplitudes (i.e. the curve labelled $E_0/N_0$ is strongly enhanced over this range). The hydrocarbon layer in this particular model leads to amplitude splitting between the two geometrical modes by about a factor of 10.

It can be seen in FIG. 4F that the steadily increasing resistivity with depth model shown in FIG. 4B strongly affects both geometries (i.e. both curves are strongly enhanced between 4 and 6 km offset) and no significant splitting between the two geometric modes occurs.

The end-on geometry data alone cannot distinguish between the two subterranean strata configurations shown in FIGS. 4A and 4B. These comparative examples conclusively demonstrate the fact that collection of survey data from both end-on and broadside geometries is needed, in order to reliably detect the hydrocarbon layer and eliminate "false-positive" detection of a rock formation containing no hydrocarbon reservoir, but merely having an increasing resistivity with depth, which is not unusual.

Lastly, the normalised curves in FIGS. 4E and 4F start off close to unity, at short ranges where the data are insensitive to the buried structure. The effects of the buried structure become greatest at between 5 and 6 km range. Beyond this, the normalised curves rapidly return towards a value of 1, because at long ranges, air wave propagation (insensitive to sub-seafloor structure) begins to dominate, thus masking the effects of the sub surface. As a result, the presence of the target structure can best be observed in controlled source electromagnetic data of this type over a relatively narrow window of source-detector separation ranges.

An efficient electromagnetic survey may use a large number of detectors distributed over a target area and a signal transmitter which operates continuously as it is towed along an extended tow path. This follows from the relatively low cost of deploying detectors and the relatively high cost of deploying a transmitter.

Figure 5:
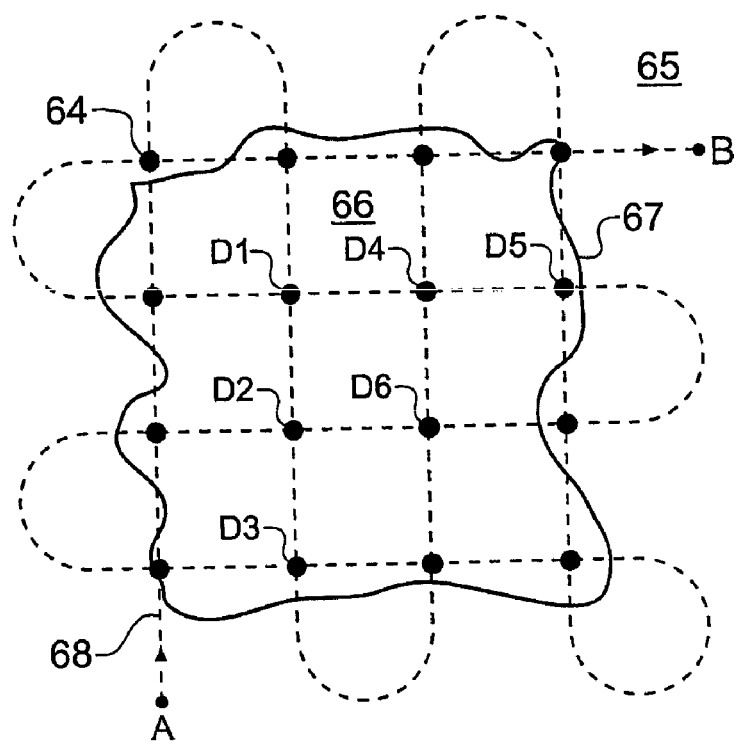
FIG. 5 is a schematic plan view showing an arrangement of sixteen detectors on a section of sea floor above a subterranean reservoir, a particular source transmitter tow path is also shown.

FIG. 5 is a schematic plan view showing an example layout of sixteen detectors 64 distributed across a section of seafloor 65 above subterranean reservoir 66. The reservoir 66 has a linear extent of several km and its boundary is indicated by a heavy line 67. In this example, the detectors 64 are uniformly distributed in a square-grid pattern so as to approximately cover the substantially square reservoir 66. In performing a survey, a source (not shown) starts from the location marked 'A' in FIG. 5 and is towed, whilst broadcasting continuously, along a path indicated by the broken line 68, the survey is completed when the source reaches the location marked 'B'. Data are continuously recorded by the detectors 64 throughout the towing process and the position of the source transmitter relative to the detector network is also logged.

During the towing process, each of the detectors 64 presents several different orientations to the source. For example, when the source is directly above the detector position D1 and on the vertical section of the tow path, the detectors at positions D2 and D3 are at different ranges in an end-on position, the detectors at positions D4 and D5 are at different ranges in a broadside position and the detector at position D6 is midway between. However, when the source later passes over the detector position D1 when on the horizontal section of the tow path, the detectors at positions D2 and D3 are now in a broadside position, and the detectors at position D4 and D5 are in an end-on position. Thus, in the course of a survey, and in conjunction with the positional information of the source, data from the detectors 64 can be used to provide details of the signal transmission through the subterranean strata for a comprehensive range of distances and orientations between source and detector, each with varying galvanic and inductive contributions to the signal propagation. In this way a simple continuous towing of the source transmitter can provide a detailed survey which covers the extent of the subterranean reservoir 66.

Although the above example is based on a square detector grid, it will be understood that a wide variety of detector placements may be used, for example other high symmetry regular grids, such as triangular or rectangular, may be used. In addition irregular grids may be used that have no high level of symmetry.

On the Detection of the Edges of a Reservoir By this Technique

We showed above that our proposed arrangement of survey geometries can both detect a hydrocarbon reservoir, and distinguish it from a general increase in resistivity with depth. The modelling though was based only on 1-D assumptions, i.e. horizontal layers of infinite horizontal extent. By using higher dimensional modelling, we show below that the survey technique also works well in the case of reservoirs of finite extent; and indeed that it can be used as a reliable means of locating the edges of a reservoir structure.

Figure 6A:
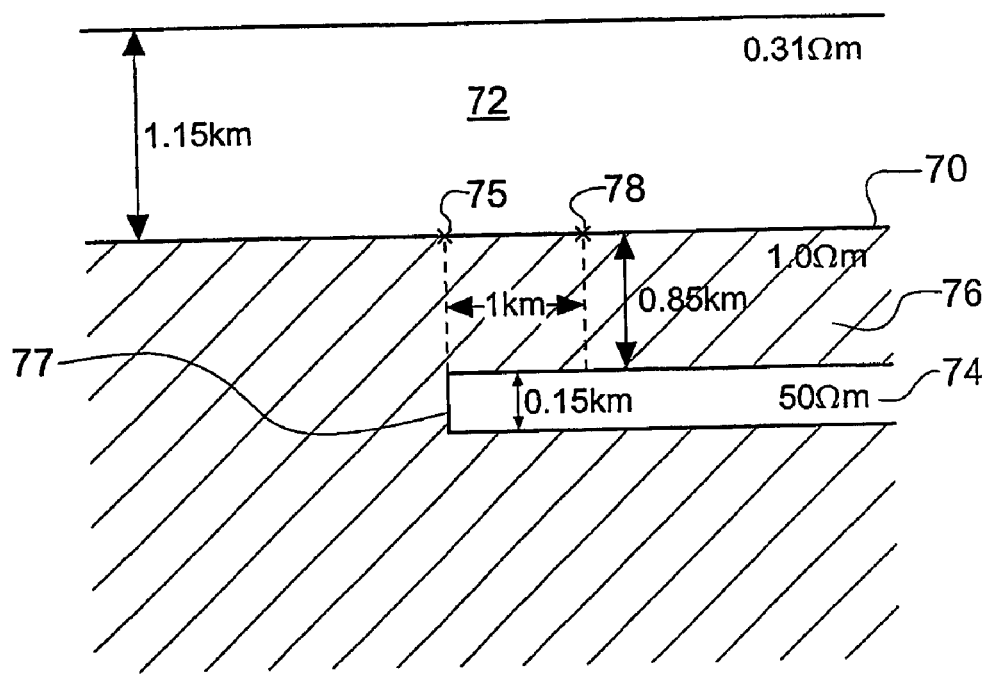
FIG. 6A shows a schematic section view of a model subterranean strata configuration containing a hydrocarbon reservoir.

FIG. 6A shows a schematic section view of a model subterranean strata configuration containing a hydrocarbon reservoir layer of finite horizontal extent. A section of seafloor 70 lies beneath a body of sea 72 which is 1.15 km deep and has a resistivity of 0.31 $\Omega$m. A planar hydrocarbon reservoir 74 is 0.15 km thick and its base is 1 km below the seafloor 70. The reservoir 74 has a resistivity of 100 $\Omega$m and extends infinitely out of the plane of FIG. 6A, and semi-infinitely within the plane of FIG. 6A. A uniform sedimentary structure 76 of resistivity 1 $\Omega$m surrounds the reservoir 74 and fills the remaining space beneath the seafloor 70. For the purposes of the model, two transmitter positions are considered. A first dipole transmitter 75 is aligned parallel to and directly above the edge 77 of the reservoir 74 on the seafloor 70. The dipole axis of the transmitter 75 is perpendicular to the plane of FIG. 6A and a cross is used to simply indicate its position rather than represent its structure. A second transmitter 78 is also on the seafloor 70 and aligned parallel to the first transmitter 75. The second transmitter 78 is horizontally displaced from the first transmitter 75 by 1 km in a direction which positions it directly above the reservoir 74 as indicated in FIG. 6A.

Figure 6B:
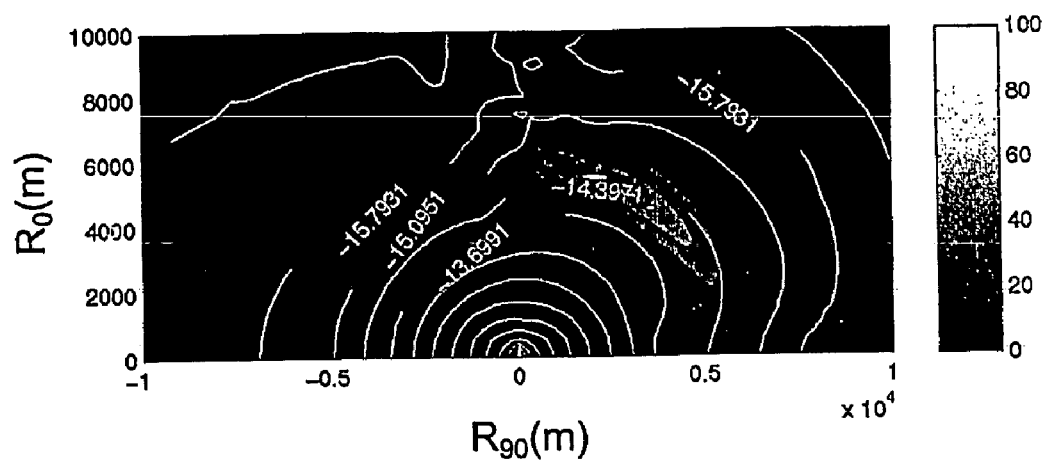
FIG. 6B is a plan view representing the normalised electric field strength as a function of location for the model subterranean strata configuration shown in FIG. 6A for a first transmitter position.
Figure 6C:
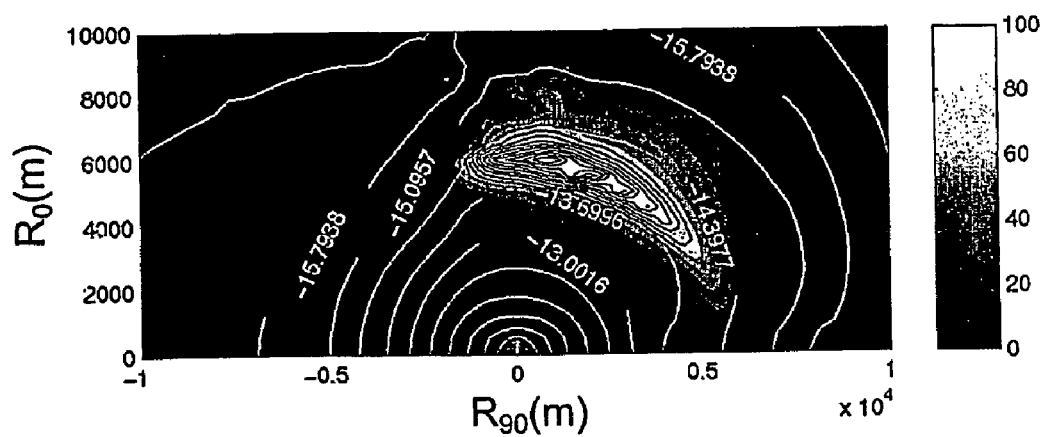
FIG. 6C is a plan view representing the normalised electric field strength as a function of location for the model subterranean strata configuration shown in FIG. 6A for a second transmitter position.

FIGS. 6B and 6C show the results of 2.5 D modelling (3-D source, 2-D resistivity structure) of the exemplary subterranean strata configuration shown in FIG. 6A for the first and second transmitter positions 75 and 78 respectively in order to investigate the effects of the finite areal extent of the resistive hydrocarbon reservoir 74. FIGS. 6B and 6C are plan views representing the normalised fields at the seafloor 70 as a function of position. The normalised field component shown in each case is the semi-major axis of the horizontal polarisation ellipse of electric field. In FIG. 6B the first transmitter 75 is at the origin of the local co-ordinate system and its dipole axis is parallel to the vertical axis in this system. In FIG. 6C the second transmitter 78 is at the origin of the local co-ordinate system and its dipole axis is parallel to the vertical axis in this system.

The normalised field amplitude is shown in a grey scale representation, while contour lines indicate the absolute value of amplitude. FIGS. 6B and 6C show that the reservoir structure causes substantial increases in the fields at positions close to end-on geometries, this is especially so when the source and detector are both over the reservoir, as in FIG. 6C. If the source or detector are at or outside the edge of the reservoir, the amplitude increase is not seen. At detector locations close to broadside geometry, the increase in amplitude is again not seen, even if both source and detector are over the reservoir. FIGS. 6B and 6C illustrate that the amplitude splitting effect is observable over reservoirs of finite size, as well as over the 1-D (layered) structures discussed previously.

The marked difference between FIGS. 6B and 6C shows that the observed fields are extremely sensitive to the location of the source (transmitter) with respect to the edge of the reservoir. In FIG. 6B, the marked asymmetry of the fields about the y axis shows that—provided the source is over the reservoir—the observed fields are also highly sensitive to the location of the detector (receiver) with respect to the edge of the reservoir. Thus by careful siting of both source tow tracks and detectors relative to a suspected hydrocarbon bearing structure, the survey method described here can provide detailed information on the areal extent of the hydrocarbon, as well as on its existence or otherwise.

In addition to initially surveying for subterranean hydrocarbon reservoirs, the utility of the invention in detecting the edges of reservoirs makes it applicable to assessing changes in hydrocarbon reservoir content over a period of time. This is of particular value, for example, where a hydrocarbon reservoir is being exploited. As water replaces the hydrocarbon which is drawn from the reservoir, regular follow up surveys can be used to determine the change in the distribution of the remaining hydrocarbon. Such surveys could therefore be used to characterise the evolution of the reservoir through time, and hence enable more efficient extraction and reservoir management.

Source and Receiver Locations—Design Considerations for Real Surveys

The methodology described in this document can be readily applied to real surveys for hydrocarbon resources on continental margins. The required transmitter and receiver characteristics in terms of power, signal to noise ratios and operating parameters can be met by existing instrumental technology.

In order to plan a successful survey, the following factors are important:

An understanding of the need to collect observations over an appropriate set of source-detector separation ranges, and using both broadside and end-on surveying geometries;

A designed layout of the detector array and of source tow line locations and orientations optimised for the above;

A designed layout for the survey that also takes account of the need to locate the limits of the areal extent of any reservoir, based on the approach presented in FIGS. 6A, 6B and 6C;

Prior modelling to establish the range of transmission frequencies, and the set of source-detector separation ranges, that should be used, taking into consideration the expected resistivity structure of the seafloor, the depth of the target, the depth of the seafloor, and the influence of the air wave on the data collected.

CONCLUSIONS

We have shown that the application of a specific set of methods to a controlled source electromagnetic survey of the seafloor can allow the technique to be successfully applied to the problem of detecting hydrocarbons beneath the seafloor. Specifically, we have shown that:

The survey should be carried out using a combination of a mobile horizontal electric dipole source transmitter, equipped with a neutrally buoyant streamed antenna and operated just above the seafloor; and an array of electric and/or magnetic field sensing receivers placed statically on the seafloor.

The effects of propagation of the signal through the atmosphere (the 'air wave') are significant at high frequencies, at long source-detector separation distances, and in shallow water. This effect limits the applicability of the method by favouring detection of structures relatively shallowly situated beneath the seafloor, but in deep water; and limits the choice of frequencies and source-detector offsets for the survey.

Improvements in data analysis can be achieved by making use of field measurement parameters aligned along the major axis of the polarisation ellipse at the seafloor.

For purposes of data presentation and interpretation it is desirable to make use of field parameters that have been normalised with reference to an appropriate simplified model of the sub-seafloor structure.

In order to resolve the presence of any hydrocarbon, and to distinguish its effect on the data from other likely structures and reduce the ambiguity of interpretation, it is essential to collect survey data from both the end-on and broadside geometric configurations; and to analyse the data in terms of splitting between the two geometric modes.

2.5 D modelling shows that provided an appropriately designed array of receivers, and an appropriate set of transmitter tow tracks, are used, then the method can yield valuable information about the limits of the areal extent of any sub-seafloor hydrocarbon reservoir, as well as detecting its presence.

Finally it will be understood that the invention is equally applicable to surveying of freshwater, for example large lakes, so that references to seafloor, seawater etc. should not be regarded as limiting.

References:
1. Sinha, M. C., Patel, P. D., Unsworth, M. J., Owen, T. R. E. & MacCormack, M. R. G. An active source electromagnetic sounding system for marine use. *Mar. Geophys. Res.*, 12, 1990, 59–68.
2. MacGregor, L. M., Constable, S. C. & Sinha, M. C. The RAMESSES experiment III: Controlled source electromagnetic sounding of the Reykjanes Ridge at 57° 45' N. *Geophysical Journal International*, 135, 1998, 773–789.
3. MacGregor, L. M. & Sinha, M. C. Use of marine controlled source electromagnetic sounding for sub-basalt exploration. *Geophysical Prospecting*, 48, 2000, 1091–1106.
4. MacGregor, L., Sinha, M. & Constable, S. Electrical resistivity structure of the Valu Fa Ridge, Lau Basin, from marine controlled source electromagnetic sounding. *Geophys. J. Int.*, 146, 217–236, 2001.
5. Evans, R. L., Sinha, M. C., Constable, S. C. & Unsworth, M. J. On the electrical nature of the axial melt zone at 13°N on the East Pacific Rise. *J. Geophys. Res.*, 99, 1994, 577–588.
6. WO 00/13046
7. WO 01/57555

The invention claimed is:
1. An electromagnetic survey method for surveying an area previously identified as potentially containing a subsea hydrocarbon reservoir, comprising:
providing an electromagnetic source having a dipole axis and first and second detectors;
obtaining first and second survey data sets by moving the electromagnetic source relative to each detector to collect data over a range of source-to-detector distances,
wherein the first survey data set is obtained with the dipole axis of the electromagnetic source aligned end-on relative to the first detector so that the first survey data set is sensitive to resistive hydrocarbon layers exploiting largely galvanic effects, and
wherein the second survey data set is obtained with the dipole axis of the electromagnetic source aligned broadside relative to the second detector so that the second survey data set is relatively insensitive to resistive hydrocarbon layers exploiting dominantly inductive effects.

2. An electromagnetic survey method according to claim 1, wherein the first and second survey data sets are obtained concurrently.

3. An electromagnetic survey method according to claim 1, wherein a right angle is formed between a first line leading from the first detector to the electromagnetic source and a second line leading from the second detector to the electromagnetic source.

4. An electromagnetic survey method according to claim 1, wherein the electromagnetic source is a mobile horizontal electric dipole source equipped with a streamed antenna which is towed above the seafloor to obtain the first and second survey data sets.

5. An electromagnetic survey method according to claim 1, wherein each detector is static while the first and second survey data sets are obtained.

6. An electromagnetic survey method according to claim 5, wherein each detector is placed on the seafloor while the first and second survey data sets are obtained.

7. A method of analysing results from an electromagnetic survey of an area potentially containing a subsea hydrocarbon reservoir, comprising:
providing first and second survey data sets obtained using the method of claim 1; and
combining the first and second survey data sets to obtain a results data set that represents a difference between the end-on and broadside alignments as a function of the source-to-detector distances surveyed.

8. A method of analysing results from an electromagnetic survey according to claim 7, further comprising:
normalising each of the first and second survey data sets relative to respective first and second normalisation data sets or functions specific to the end-on and broadside alignments respectively, prior to the combining.

9. A method of analysing results from an electromagnetic survey according to claim 8, wherein the first and second normalisation data sets or functions are calculated from a rock formation model.

10. A method of analysing results from an electromagnetic survey according to claim 8, wherein the first and second normalisation data sets or functions are calculated from the first and second survey data sets.

11. A method of analysing results from an electromagnetic survey according to claim 7, wherein the first and second data sets each comprise radial and azimuthal components of electric field or magnetic field measured at the detector, the method further comprising:
transforming the radial and azimuthal components into at least one polarisation ellipse parameter, prior to the combining.

12. A method of analysing results from an electromagnetic survey according to claim 11, wherein the at least one polarisation ellipse parameter is the amplitude and/or phase of the component of the electric field or magnetic field aligned along a major axis of the ellipse.

13. A method of analysing results from an electromagnetic survey according to claim 7, further comprising:

visually representing the results data set in a plot of at least two dimensions corresponding to the survey area.

14. A method of analysing results from an electromagnetic survey according to claim 13, wherein the plot includes markings of areas of equal or similar electromagnetic field strength.

15. A method of analysing results from an electromagnetic survey according to claim 13, further comprising: normalising each of the first and second survey data sets relative to respective first and second normalisation data sets or functions specific to the end-on and broadside alignments respectively, prior to the combining, and wherein the plot includes markings of areas of equal or similar electromagnetic field strength, and wherein the plot includes lines of equal absolute electromagnetic field strength.

16. An electromagnetic survey method for surveying an area previously identified as potentially containing a subsea hydrocarbon reservoir, comprising:
providing an electromagnetic source having a dipole axis and a first detector;
obtaining first and second survey data sets by moving the electromagnetic source relative to the first detector to collect data over a range of source-to-detector distances and orientations,
wherein the first survey data set is obtained with the dipole axis of the electromagnetic source aligned end-on relative to the first detector so that the first survey data set is sensitive to resistive hydrocarbon layers exploiting largely galvanic effects, and
wherein the second survey data set is obtained with the dipole axis of the electromagnetic source aligned broadside relative to the first detector so that the second survey data set is relatively insensitive to resistive hydrocarbon layers exploiting dominantly inductive effects.

17. An electromagnetic survey method according to claim 16, wherein the first and second survey data sets are obtained consecutively.

18. An electromagnetic survey method according to claim 16, wherein the electromagnetic source is moved in a direction along a line connecting the electromagnetic source to the detector to obtain one of the first and second survey data sets and again transverse thereto to obtain the other of the first and second survey data sets.

19. An electromagnetic survey method according to claim 16, wherein the electromagnetic source is a mobile horizontal electric dipole source equipped with a streamed antenna which is towed above the seafloor to obtain the first and second survey data sets.

20. An electromagnetic survey method according to claim 16, wherein each detector is static while the first and second survey data sets are obtained.

21. An electromagnetic survey method according to claim 20, wherein each detector is placed on the seafloor while the first and second survey data sets are obtained.

22. A method of analysing results from an electromagnetic survey of an area potentially containing a subsea hydrocarbon reservoir, comprising:
providing first and second survey data sets obtained using the method of claim 16; and
combining the first and second survey data sets to obtain a results data set that represents a difference between the end-on and broadside alignments as a function of the source-to-detector distances surveyed.

23. A method of analysing results from an electromagnetic survey according to claim 22, further comprising:
normalising each of the first and second survey data sets relative to respective first and second normalisation data sets or functions specific to the end-on and broadside alignments respectively, prior to the combining.

24. A method of analysing results from an electromagnetic survey according to claim 23, wherein the first and second normalisation data sets or functions are calculated from a rock formation model.

25. A method of analysing results from an electromagnetic survey according to claim 23, wherein the first and second normalisation data sets or functions are calculated from the first and second survey data sets.

26. A method of analysing results from an electromagnetic survey according to claim 22, wherein the first and second data sets each comprise radial and azimuthal components of electric field or magnetic field measured at the detector, the method further comprising:
transforming the radial and azimuthal components into at least one polarisation ellipse parameter, prior to the combining.

27. A method of analysing results from an electromagnetic survey according to claim 26, wherein the at least one polarisation ellipse parameter is the amplitude and/or phase of the component of the electric field or magnetic field aligned along a major axis of the ellipse.

28. A method of analysing results from an electromagnetic survey according to claim 22, further comprising:
visually representing the results data set in a plot of at least two dimensions corresponding to the survey area.

29. A method of analysing results from an electromagnetic survey according to claim 28, wherein the plot includes markings of areas of equal or similar electromagnetic field strength.

30. A method of analysing results from an electromagnetic survey according to claim 28, further comprising: normalising each of the first and second survey data sets relative to respective first and second normalisation data sets or functions specific to the end-on and broadside alignments respectively, prior to the combining, and wherein the plot includes markings of areas of equal or similar electromagnetic field strength, and wherein the plot includes lines of equal absolute electromagnetic field strength.

31. A computer program product bearing machine readable instructions for implementing a method of analysing results from an electromagnetic survey of an area potentially containing a subsea hydrocarbon reservoir, comprising:
providing first and second survey data sets obtained using the method of claim 1; and
combining the first and second survey data sets to obtain a results data set that represents a difference between the end-on and broadside alignments as a function of the source-to-detector distances surveyed.

32. A computer apparatus loaded with machine readable instructions for implementing a method of analysing results from an electromagnetic survey of an area potentially containing a subsea hydrocarbon reservoir, comprising:
providing first and second survey data sets obtained using the method of claim 1; and
combining the first and second survey data sets to obtain a results data set that represents a difference between the end-on and broadside alignments as a function of the source-to-detector distances surveyed.

33. A computer program product bearing machine readable instructions for implementing a method of analysing results from an electromagnetic survey of an area potentially containing a subsea hydrocarbon reservoir, comprising:

providing first and second survey data sets obtained using the method of claim 16; and combining the first and second survey data sets to obtain a results data set that represents a difference between the end-on and broadside alignments as a function of the source-to-detector distances surveyed.

34. A computer apparatus loaded with machine readable instructions for implementing a method of analysing results from an electromagnetic survey of an area potentially containing a subsea hydrocarbon reservoir, comprising:

providing first and second survey data sets obtained using the method of claim 16; and combining the first and second survey data sets to obtain a results data set that represents a difference between the end-on and broadside alignments as a function of the source-to-detector distances surveyed.

35. A method of planning an electromagnetic survey of an area identified as potentially containing a subsea hydrocarbon reservoir, comprising:

creating a model of the area to be surveyed, including a rock formation containing a hydrocarbon reservoir and a body of water above the rock formation;

setting values for water depth, depth below the seafloor of the hydrocarbon reservoir, and resistivity structure of the rock formation;

performing a simulation of an electromagnetic survey in the model of the survey area by calculating first and second survey data sets by simulating an electromagnetic source having a dipole axis and first and second detectors and moving the electromagnetic source relative to each detector to collect data over a range of source-to-detector distances, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the second detector so that the second survey data set is relatively insensitive to resistive hydrocarbon layers exploiting dominantly inductive effects; and combining the first and second survey data sets to obtain a results data set that represents a difference between the end-on and broadside alignments as a function of the source-to-detector distances.

36. A method of planning an electromagnetic survey according to claim 35, further comprising:

repeating the simulation for a number of source frequencies in order to select optimum surveying conditions in terms of source frequency and source-to-detector distances for probing the hydrocarbon reservoir.

37. A method of planning an electromagnetic survey according to claim 35, wherein the model includes a body of air above the body of water, and wherein the simulation takes account of signal propagation paths including the body of air when calculating the first and second survey data sets.

38. A method of planning an electromagnetic survey according to claim 35, further comprising:

normalising each of the first and second survey data sets relative to respective first and second normalisation data sets or functions specific to the end-on and broadside alignments respectively, prior to the combining.

39. A method of planning an electromagnetic survey according to claim 35, wherein the first and second data sets each comprise radial and azimuthal components of electric field or magnetic field measured at the detector, the method further comprising:

transforming the radial and azimuthal components into at least one polarisation ellipse parameter, prior to the combining.

40. A method of planning an electromagnetic survey according to claim 35, further comprising visually representing the results data set in a plot of at least two dimensions corresponding to the survey area.

41. A method of planning an electromagnetic survey according to claim 40, wherein the plot includes markings of areas of equal or similar electromagnetic field.

42. A method of planning an electromagnetic survey according to claim 40, further comprising: normalising each of the first and second survey data sets relative to respective first and second normalisation data sets or functions specific to the end-on and broadside alignments respectively, prior to the combining, and wherein the plot includes markings of areas of equal or similar electromagnetic field, and wherein the plot includes lines of equal absolute electromagnetic field strength.

43. A method of planning an electromagnetic survey of an area identified as potentially containing a subsea hydrocarbon reservoir, comprising:

creating a model of the area to be surveyed, including a rock formation containing a hydrocarbon reservoir and a body of water above the rock formation;

setting values for water depth, depth below the seafloor of the hydrocarbon reservoir, and resistivity structure of the rock formation;

performing a simulation of an electromagnetic survey in the model of the survey area by calculating first and second survey data sets by simulating an electromagnetic source having a dipole axis and a first detector and moving the electromagnetic source relative to the first detector to collect data over a range of source-to-detector distances and orientations, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the first detector so that the second survey data set is relatively insensitive to resistive hydrocarbon layers exploiting dominantly inductive effects; and combining the first and second survey data sets to obtain a results data set that represents a difference between the end-on and broadside alignments as a function of the source-to-detector distances.

44. A method of planning an electromagnetic survey according to claim 43, further comprising:

repeating the simulation for a number of source frequencies in order to select optimum surveying conditions in terms of source frequency and source-to-detector distances for probing the hydrocarbon reservoir.

45. A method of planning an electromagnetic survey according to claim 43, wherein the model includes a body of air above the body of water, and wherein the simulation takes account of signal propagation paths including the body of air when calculating the first and second survey data sets.

46. A method of planning an electromagnetic survey according to claim 43, further comprising:

normalising each of the first and second survey data sets relative to respective first and second normalisation data sets or functions specific to the end-on and broadside alignments respectively, prior to the combining.

47. A method of planning an electromagnetic survey according to claim 43, wherein the first and second data sets each comprise radial and azimuthal components of electric field or magnetic field measured at the detector, the method further comprising:
    transforming the radial and azimuthal components into at least one polarisation ellipse parameter, prior to the combining.

48. A method of planning an electromagnetic survey according to claim 43, further comprising visually representing the results data set in a plot of at least two dimensions corresponding to the survey area.

49. A method of planning an electromagnetic survey according to claim 48, wherein the plot includes markings of areas of equal or similar electromagnetic field.

50. A method of planning an electromagnetic survey according to claim 48, further comprising: normalising each of the first and second survey data sets relative to respective first and second normalisation data sets or functions specific to the end-on and broadside alignments respectively, prior to the combining, and wherein the plot includes markings of areas of equal or similar electromagnetic field, and wherein the plot includes lines of equal absolute electromagnetic field strength.

51. A computer program product bearing machine readable instructions for implementing a method of planning an electromagnetic survey of an area identified as potentially containing a subsea hydrocarbon reservoir, comprising:
    creating a model of the area to be surveyed, including a rock formation containing a hydrocarbon reservoir and a body of water above the rock formation;
    setting values for water depth, depth below the seafloor of the hydrocarbon reservoir, and resistivity structure of the rock formation;
    performing a simulation of an electromagnetic survey in the model of the survey area by calculating first and second survey data sets by simulating an electromagnetic source having a dipole axis and first and second detectors and moving the electromagnetic source relative to each detector to collect data over a range of source-to-detector distances, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the second detector so that the second survey data set is relatively insensitive to resistive hydrocarbon layers exploiting dominantly inductive effects; and
    combining the first and second survey data sets to obtain a results data set that represents a difference between the end-on and broadside alignments as a function of the source-to-detector distances.

52. A computer apparatus loaded with machine readable instructions for implementing a method of planning an electromagnetic survey of an area identified as potentially containing a subsea hydrocarbon reservoir, comprising:
    creating a model of the area to be surveyed, including a rock formation containing a hydrocarbon reservoir and a body of water above the rock formation;
    setting values for water depth, depth below the seafloor of the hydrocarbon reservoir, and resistivity structure of the rock formation;
    performing a simulation of an electromagnetic survey in the model of the survey area by calculating first and second survey data sets by simulating an electromagnetic source having a dipole axis and first and second detectors and moving the electromagnetic source relative to each detector to collect data over a range of source-to-detector distances, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the second detector so that the second survey data set is relatively insensitive to resistive hydrocarbon layers exploiting dominantly inductive effects; and
    combining the first and second survey data sets to obtain a results data set that represents a difference between the end-on and broadside alignments as a function of the source-to-detector distances.

53. A computer program product bearing machine readable instructions for implementing a method of planning an electromagnetic survey of an area identified as potentially containing a subsea hydrocarbon reservoir, comprising:
    creating a model of the area to be surveyed, including a rock formation containing a hydrocarbon reservoir and a body of water above the rock formation;
    setting values for water depth, depth below the seafloor of the hydrocarbon reservoir, and resistivity structure of the rock formation;
    performing a simulation of an electromagnetic survey in the model of the survey area by calculating first and second survey data sets by simulating an electromagnetic source having a dipole axis and a first detector and moving the electromagnetic source relative to the first detector to collect data over a range of source-to-detector distances and orientations, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the first detector so that the second survey data set is relatively insensitive to resistive hydrocarbon layers exploiting dominantly inductive effects; and
    combining the first and second survey data sets to obtain a results data set that represents a difference between the end-on and broadside alignments as a function of the source-to-detector distances.

54. A computer apparatus loaded with machine readable instructions for implementing a method of planning an electromagnetic survey of an area identified as potentially containing a subsea hydrocarbon reservoir, comprising:
    creating a model of the area to be surveyed, including a rock formation containing a hydrocarbon reservoir and a body of water above the rock formation;
    setting values for water depth, depth below the seafloor of the hydrocarbon reservoir, and resistivity structure of the rock formation;
    performing a simulation of an electromagnetic survey in the model of the survey area by calculating first and second survey data sets by simulating an electromagnetic source having a dipole axis and a first detector and moving the electromagnetic source relative to the first detector to collect data over a range of source-to-detector distances and orientations, wherein the first survey data set is obtained with the dipole axis of the electromagnetic source aligned end-on relative to the first detector so that the first survey data set is sensitive to resistive hydrocarbon layers exploiting largely galvanic effects, and wherein the second survey data set is obtained with the dipole axis of the electromagnetic source aligned broadside relative to the first detector so that the second survey data set is relatively insensitive to resistive hydrocarbon layers exploiting dominantly inductive effects; and combining the first and second survey data sets to obtain a results data set that represents a difference between the end-on and broadside alignments as a function of the source-to-detector distances.

* * * * *

UNITED STATES PATENT AND TRADEMARK OFFICE
CERTIFICATE OF CORRECTION

PATENT NO. : 7,126,338 B2 Page 1 of 1
APPLICATION NO. : 10/497807
DATED : October 24, 2006
INVENTOR(S) : Eidesmo et al.

It is certified that error appears in the above-identified patent and that said Letters Patent is hereby corrected as shown below:

On The Title Page; Item (75)   Inventors: Please delete "Lucy M. MacGregor, Southampton (GB); Martin C. Sinha, Edinburgh (GB)", insert -- Terje Eidesmo, (NO), and Svein Ellingsrud, (NO) --

Signed and Sealed this

Twenty-third Day of January, 2007

JON W. DUDAS
*Director of the United States Patent and Trademark Office*